May 12, 1931.  M. P. WETMORE  1,804,484
BOTTLE SILVERING MACHINE
Filed July 30, 1927    2 Sheets-Sheet 1
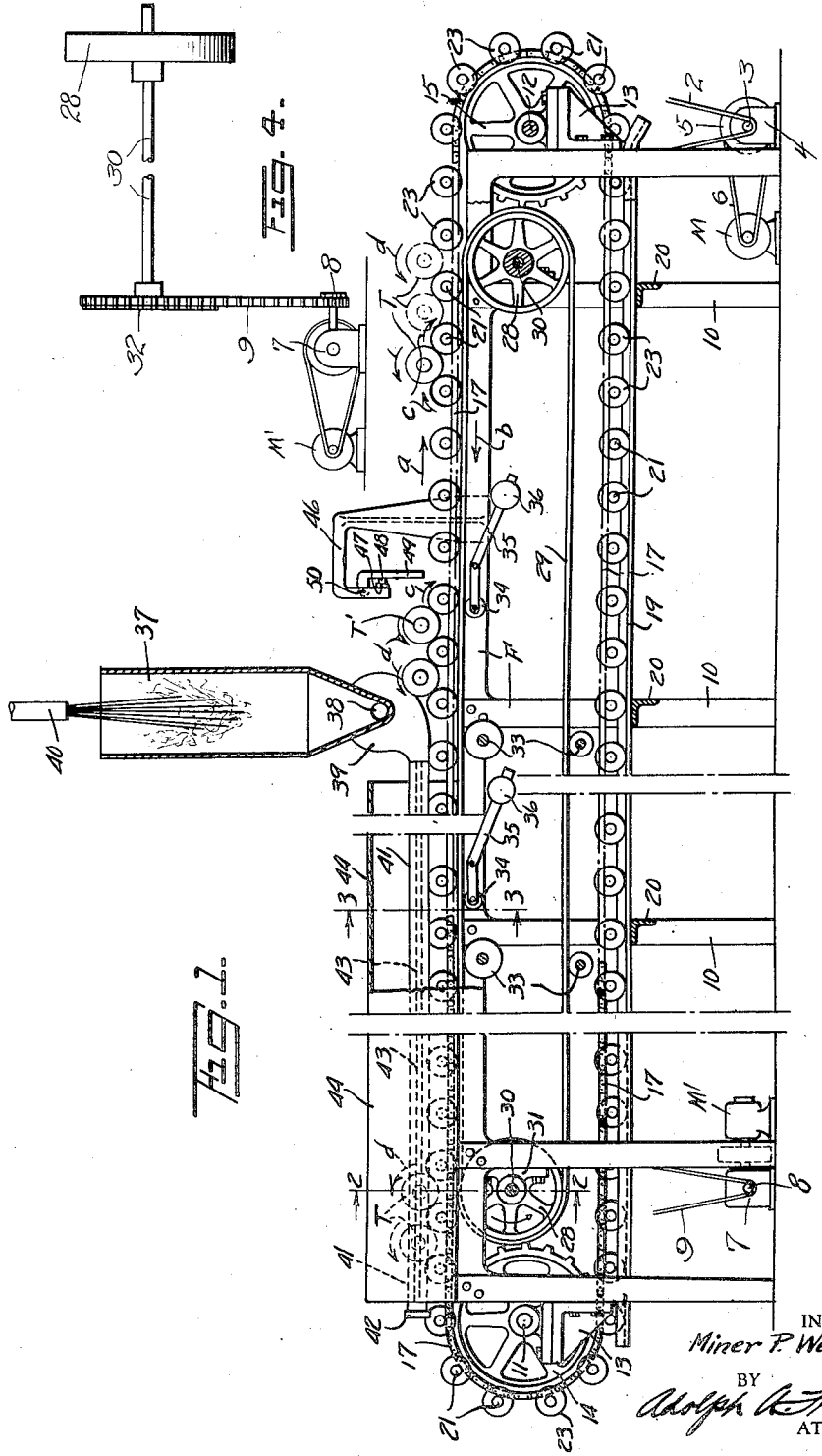
INVENTOR
Miner P. Wetmore
BY
ATTORNEY

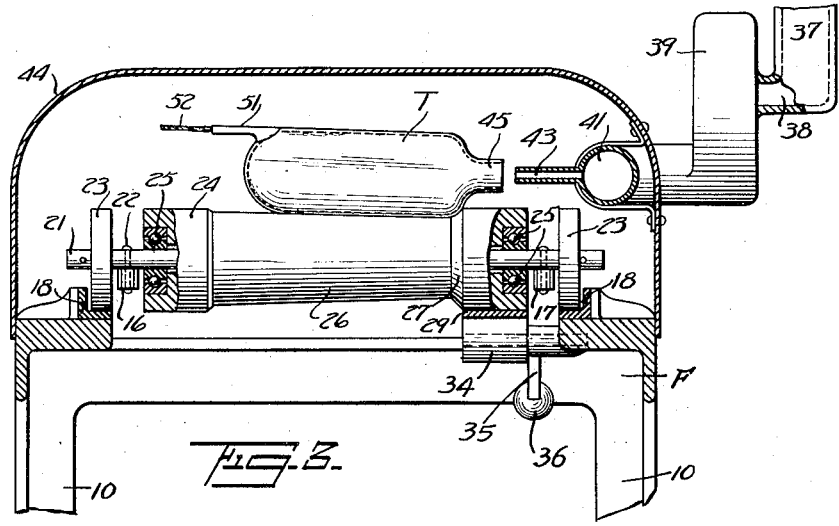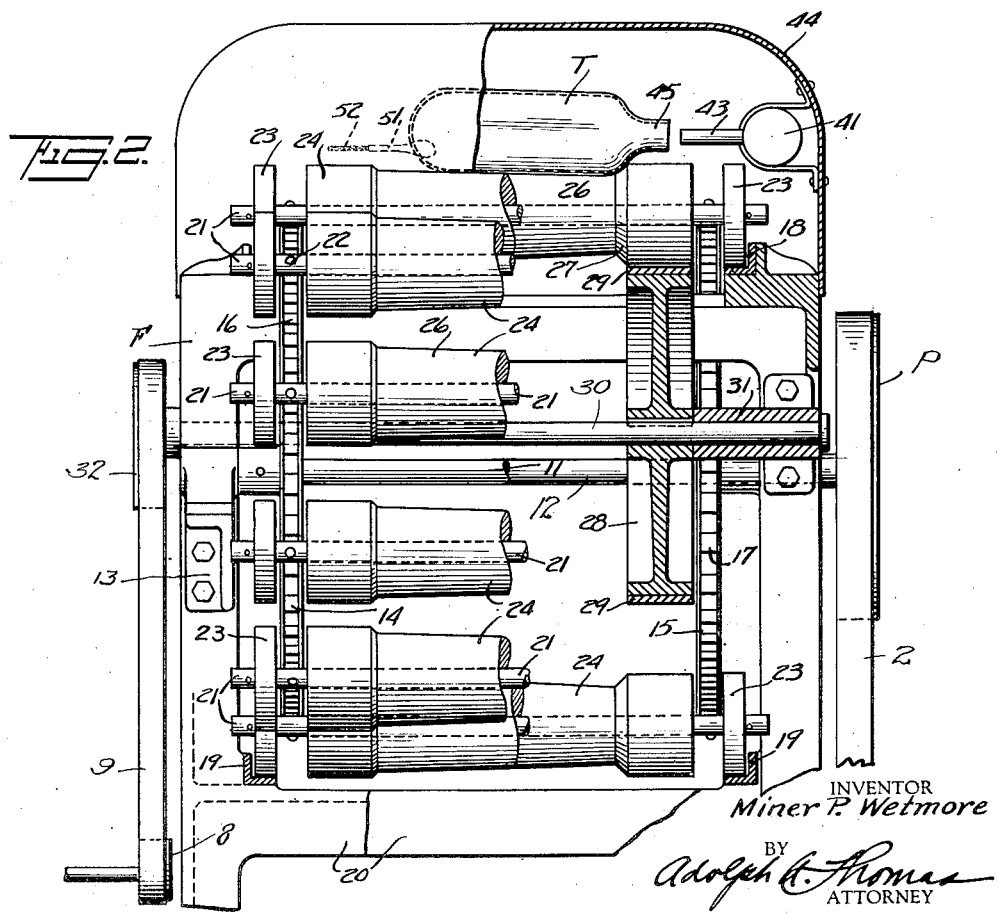

Patented May 12, 1931

1,804,484

UNITED STATES PATENT OFFICE

MINER P. WETMORE, OF NORWICH, CONNECTICUT, ASSIGNOR TO THE AMERICAN THERMOS BOTTLE COMPANY, OF NORWICH, CONNECTICUT, A CORPORATION OF OHIO

BOTTLE-SILVERING MACHINE

Application filed July 30, 1927. Serial No. 209,605.

My invention relates to the manufacture of bottles and other receptacles of the double-walled vacuum type. It is well known that these receptacles contain a glass filler consisting of two concentric cylinders united at the top and spaced by an annular vacuum chamber. The inner cylinder serves as a container, and the vacuum chamber keeps the contents of the container hot or cold for a considerable period. To improve the temperature-retaining quality of the receptacle, the inner walls of the vacuum chamber are silvered. This practice has been going on for many years and has been carried out largely by hand.

The object of my invention is to provide new and improved apparatus for handling vacuum bottles containing a silver solution so as to cause a uniform precipitation of silver on the inside walls of the fillers, to accelerate or assist the precipitating operation, and to prepare the bottles for the final step of drying and setting the silver coating. To this end I have devised a machine having an endless carrier of spaced rollers for supporting the bottles containing a silver solution. These rollers not only travel forwardly like a belt to carry the bottles from one end of the conveyor to the other, but they are also rotated about their axes to turn the bottles over and over while they are being carried forward. In this way the walls of the vacuum chambers are brought into contact with the silver solution over their entire surface, thereby producing a substantially uniform coating of silver. During the slow movement of the bottles toward the discharging end of the conveyor, they are subjected to moderate heat which assists or tends to accelerate the precipitation of silver from the solution. This heating is preferably accomplished by directing a continuous blast of hot air over and into the bottles as they move along, so that the surface in contact with the silver solution is heated to produce the most favorable conditions for the precipitation of metallic silver on the glass. After the bottles have travelled on the conveyor a sufficient distance to complete the precipitation, they are removed by the operator, who empties the remaining solution and fills the silvered vacuum chamber with water, whereupon the bottles are again placed on the conveyor. As the water-filled bottles are rotated, the walls of the vacuum chamber are thoroughly rinsed and cleared of any congealed silver solution or lumpy precipitate that may have remained. At the discharging end of the conveyor the bottles are removed and prepared for the final baking operation in an oven. To make sure that all bottles are removed for emptying the silver solution and filling them with water, I provide a switch device which is automatically operated by a bottle on the conveyor to open the motor circuit and stop the carrier without interrupting the turning movement of the bottles. When the bottle at the switch device is removed, the motor circuit is again closed and the machine operates as before.

My invention will be fully understood from a detailed description of the accompanying drawings which illustrate a practical embodiment of my invention as actually constructed and used. In these drawings—

Fig. 1 shows a side view of a bottle-silvering machine built in accordance with my invention, certain sections being broken away for lack of space;

Fig. 2 is a front view of the machine, with certain parts in section on line 2—2 of Fig. 1;

Fig. 3 represents a cross-sectional view on line 3—3 of Fig. 1; and

Fig. 4 represents diagrammatically a simplified form of driving arrangement for the belt that turns the rollers of the carrier.

The movable parts of the machine are mounted on a suitable frame indicated as a whole by F, which may conveniently be constructed of cast iron and supported on legs 10. At the front or loading end of the machine is mounted transversely a rotary shaft 11, and a similar shaft 12 is supported at the discharging end of the machine. These shafts are journalled in bearings on brackets 13 bolted to the legs of the frame. On shaft 11 are fixed two sprocket wheels 14, and the rear shaft 12 carries a pair of sprocket wheels 15. One sprocket wheel of each pair is shown in Fig. 2. The sprocket wheels 14 and 15 are connected by a pair of endless chains 16 and 17, which engage the teeth of the sprocket wheels so as to be driven thereby. The chains 16 and 17 may be of the well-known link-belt type. The sprocket shafts 11 and 12 are driven by any suitable connections, as by means of a pulley P mounted on shaft 12 and operatively connected with an electric motor M or other source of power. In Fig. 1, the pulley P is driven by a belt 2 from the shaft 3 of a reduction gear box 4. The sprocket or pulley 5 of the gear box is connected to the motor shaft by a chain or belt 6. In a machine as actually constructed and operated, I use a ¾ H. P. motor and a 50:1 gear reduction. I mention these figures merely as information and not by way of limitation, for any practical driving mechanism may be employed to operate the carrier chains 16 and 17 at the proper speed.

On top of frame F are fixed longitudinal tracks 18, and similar tracks 19 are supported on cross-pieces 20 between the legs of the frame. The tracks 18 and 19 preferably consist of angle iron, which also serve to strengthen and brace the frame, particularly the legs 10. To the driving chains 16 and 17 are secured a sufficient number of cross-shafts 21 by means of bolts or rivets 22, or in any other practical way. These shafts are spaced equal distances apart and are supported on wheels 23 arranged to run on the guide tracks 18 and 19. On shafts 21 are mounted rollers 24 by means of ball-bearings 25. These rollers, which may conveniently be made of cast aluminum, are so spaced that a vacuum bottle T is supported between each pair of rollers. As seen in Figs. 2 and 3, the central section 26 of each roller 24 tapers slightly toward one end, forming a bevelled shoulder 27 against which the bottle rests. The shoulders 27, therefore, act like stops to hold the bottles in alignment.

Below the top of frame F are mounted two pulleys 28 for supporting an endless belt 29, which may be a 2-inch leather belt. The pulleys 28 are mounted on counter-shafts 30 journalled in suitable bearing brackets 31 which are secured to the legs 10 of the frame. One of the shafts 30 is provided with a pulley or sprocket wheel 32 for driving the belt 29. The pulley or sprocket wheel 32 is driven by any suitable connections. For example, in Figs. 1 and 4 I have diagrammatically indicated an electric motor M' connected to a reduction gear box 7 having a small pulley or sprocket 8 connected to member 32 by a chain or belt 9. In the machine as actually built and operated in a commercial way, I have found that a ½ H. P. motor is sufficient to operate the belt 29, using a 2-inch sprocket at 8 and a 6-inch sprocket at 32. The motor M' (which may be any suitable source of power) drives the belt 29 independently of the operation of the carrier by the motor M. Therefore, stopping the motor M does not interrupt the movement of the belt 29. The purpose of this will appear later. The upper run of belt 29 is in frictional driving engagement with one end of the aluminum rollers 24. Suitable means are provided for maintaining the belt 29 at the proper degree of tautness. In Fig. 1 I have shown several supporting rollers 33 and tightening rollers 34 of the well known weighted type. The rollers 34 are carried by pivoted levers 35 having weighted ends 36, which press the rollers against the belt. These rollers are arranged sufficiently close together to hold the belt tensioned. Any other practical means may be used for maintaining the belt 29 in driving contact with the carriers 24.

The spaced rollers 24, which constitute an endless carrier for the bottles, are moved forwardly at the proper speed in the direction of arrow $a$ in Fig. 1. The belt 29, however, is driven in the opposite direction, as indicated by arrow $b$. Consequently, while the bottles T are being conveyed from left to right (as viewed in Fig. 1) by the rollers 24, the latter are at the same time rotated about their axes in a clockwise direction, as marked by arrows $c$. The bottles on the rotating rollers 24 are therefore turned counterclockwise in the direction of arrows $d$. In the machine that I have operated in a commercial way, the speed of belt 29 is such that the rollers 24 make about sixty revolutions a minute. To prevent needless obscuring of Fig. 1, I have indicated only a few bottles supported on the rollers 24. In practice, of course, there is supposed to be a bottle between each pair of rollers. The rotation of the bottles as they are slowly carried from the loading to the discharging end of the conveyor brings the entire wall surface of the vacuum chamber in contact with the solution, thus insuring a substantially uniform deposit of silver.

The precipitation of metallic silver from the solution in the bottles is facilitated by the application of heat. I therefore provide means for heating the bottles as they pass over the conveyor. Above the center of frame F is supported a tank 37 which communicates through an opening 38 with a blower 39. Over the open end of tank 37 is a gas burner 40 for heating the air in the tank. The blower 39 connects with a horizontal pipe 41 suitably supported at one side of frame F. The pipe 41 is closed at its outer end 42 and is formed with a lateral discharge slot or nozzle 43, which runs the entire length of the pipe. If desired, a sheet metal hood 44 may be supported on frame F to enclose the heating pipe 41 and the bottles that pass by. As seen in Fig. 3, the slot or nozzle 43 of pipe 41 is arranged close to, and in line with, the open necks 45 of the bottles, whereby hot air streaming out of the slot 43 is projected directly into the inner cylinder of each bottle. At the same time, some of the hot air issuing out of pipe 41 heats the outer cylinders of the bottles, and the hood 44 acts as an oven to retain the heated air around the bottles. In this way the glass surfaces to be coated are maintained at a heat most favorable to the precipitation of metallic silver. The blower 39 is driven at such speed as to force the hot air through nozzle 43 at the desired pressure. By the time the bottles pass out of hood 44, the silvering is complete. In the machine that I have actually constructed and operated, the carrier formed by the rollers 24 moves at the rate of about eight feet a minute, and when the bottles emerge from the hood 44 they have travelled nearly thirty feet. This means that about four minutes is sufficient to effect the precipitation of silver in each bottle on the conveyor. The capacity of the particular machine shown in the drawings is thirty bottles.

When a bottle has reached the position T' in Fig. 1, the operator removes it and draws all the remaining silver solution by connecting the bottle with a vacuum pump. The empty vacuum chamber is then filled with water, and the bottle is put back on the carrier at the nearest point behind the switch device 46. As the water-filled bottles travel toward the discharge end of the conveyor, they are thoroughly rinsed to remove any lumps of silver precipitate that may have formed on the walls of the vacuum chamber. This gives a uniformly smooth and even coating. At the end of the conveyor the bottles are removed for further treatment, about which I need not go into detail, since it forms no part of my present invention.

The switch device 46 comprises a fixed contact 47 and a movable contact 48 carried by a dependent arm 49 hinged at 50. Gravity normally holds the contact 48 against contact 47 to close the circuit of the electric motor M that drives the conveyor pulley P for moving the sprocket chains 16 and 17. It will be seen in Fig. 1 that, if the operator does not remove the bottle T', the latter will strike the dependent arm 49 and break the motor circuit, whereupon the conveyor chains 16 and 17 stop, so that all bottles on rollers 24 are stopped in their forward movement. However, the belt 29 continues to move and therefore the rollers 24 keep on rotating and turn the bottles supported thereon. The uninterrupted turning or agitating of the bottles is necessary to insure uniform silvering of the vacuum chambers, as already explained. As soon as the operator removes the bottle which opened the switch device 46, the swinging arm 49 automatically closes the motor circuit and the conveyor resumes its forward movement.

As previously pointed out, the bottles T are supported on the tapering sections 26 of rollers 24, so as to incline downwardly at the neck and rest against the bevelled shoulders 27. This holds the bottles in alignment close to the hot-air nozzle 43. Also, by inclining the bottles downwardly at the neck, the amount of leakage through the tubular extensions 51 is lessened. While these tubular extensions are closed by stems 52, which may be ordinary pipe cleaners, this temporary closure is not water-tight, and as the bottles turn, some of the silver solution may leak past the stems 52 and drip down through the machine. For this reason the belt 29 is arranged away from the tubular extensions 51, so as to be out of the way of any drippings from the base end of the bottles.

Although I have shown and described a specific construction, I want it distinctly understood that my invention is not limited to the details herein set forth. It is to be expected that changes and modifications will occur to others in building machines in accordance with my invention. The novel features of my invention may be mechanically embodied in various forms without departing from the scope of the appended claims.

I claim as my invention:

1. In a machine of the class described, a movable carrier comprising spaced rollers for supporting cylindrical bodies, means for mounting said rollers to rotate about their axes, and rotary means engaging said rollers at the bottom to rotate the same independently of the forward movement of said carrier, whereby the cylindrical bodies supported on said rollers are rotated without being engaged by said rotating means.

2. In a bottle conveyor, a series of rollers for supporting bottles, means for moving said rollers as a unit to carry the bottles from the loading end to the discharging end of the machine, means for rotating said rollers about their axes during their forward movement, said rotating means operating independently of the bottles on said rollers, so that the bottles are turned while being carried forward and are free to be removed from the rotating rollers, and means for stopping said moving means without interrupting said rotating means.

3. A bottle conveyor comprising a pair of endless driving members, a plurality of shafts connected transversely to said members in spaced relation, rollers mounted on said shafts for supporting bottles, and means engaging said rollers at the bottom to rotate the same independently of their conveying movement and independently of the bottles supported on the rollers.

4. A bottle conveyor comprising a pair of endless driving members, a plurality of shafts connected transversely to said members in spaced relation, rollers mounted on said shafts for supporting bottles, a belt engaging said rollers to rotate the same, and means for driving said belt in a direction opposite to the forward movement of said rollers.

5. In bottle-silvering apparatus, a carrier for conveying a plurality of double-walled bottles containing a silver solution in the vacuum chamber, said carrier comprising means for supporting the bottles in a substantially horizontal position, and means for rotating said supporting means independently of the supported bottles to turn the latter during their conveying movement, so that the silver solution comes in contact with the entire surface to be silvered, said rotating means including a flexible member held in frictional engagement with the bottle-supporting means.

6. In a bottle conveyor, a series of rollers for supporting bottles, means for moving said rollers as a unit to carry the bottles from the loading end to the discharging end of the machine, a belt engaging said rollers at the bottom to rotate the same, so that the bottles are turned while being carried forward, and means on said rollers for holding the bottles in predetermined alignment.

7. In a bottle conveyor, a movable carrier having rollers for supporting open double-walled bottles in substantially horizontal position, said bottles containing a silvering solution in the space between the walls thereof, stationary tracks for supporting said carrier independently of said rollers, a series of air discharging nozzles arranged substantially parallel with the bottles and in line with the open mouths thereof to project heated air directly into the inside, a hood through which the bottles pass and which confines the hot air sufficiently to produce a substantially uniform heating of the bottles inside and outside, whereby a substantially uniform coating of silver is deposited from said solution onto the heated walls of the bottles, and means independent of said tracks for rotating the bottles during their movement through the hood to agitate the silvering solution.

8. In a bottle conveyor, a movable carrier having rollers for supporting bottles in substantially horizontal position, stationary tracks for supporting said carrier independently of said rollers, a pipe having a discharge nozzle substantially in line with the open mouths of the bottles on said carrier, means for forcing heated air through said nozzle into the bottles and around them as they are carried forwardly, and means for rotating said rollers independently of the bottles to turn the latter during their forward movement.

9. In a bottle conveyor, a movable carrier having means for supporting bottles in substantially horizontal position, stationary tracks for supporting said carrier independently of said bottle-supporting means, a pipe having a discharge nozzle substantially in line with the open mouths of the bottles on said carrier, means for forcing heated air through said nozzle into the bottles and around them as they are carried forwardly, and means for rotating said rollers independently of the bottles to turn the latter during their forward movement, said rotating means being independent of said tracks, and a hood for retaining the heated air discharged from said pipe around the bottles to heat the latter uniformly inside and outside.

10. In the manufacture of double-walled vacuum bottles, a machine having an endless carrier comprising spaced rollers for supporting bottles containing a silver solution in the vacuum chamber thereof, stationary tracks for supporting said carrier independently of said rollers, means for operating said carrier to convey the bottles forwardly, means engaging said rollers at the bottom for rotating said rollers independently of the bottles supported thereon, whereby said bottles are rotated during their forward movement to allow the silver solution to come in contact with the entire surface of each bottle to be silvered, and means for applying heated air to the inside and outside of the bottles as they pass through a certain section of the machine to facilitate the precipitation of silver.

11. In bottle-silvering apparatus, a movable carrier having spaced rollers for supporting a plurality of double-walled bottles containing a silver solution in the vacuum chamber, said bottles being supported in substantially horizontal position, means for rotating said bottles while on the carrier, so that the silver solution comes in contact with the entire surface to be silvered, said rotating means including a driving member in contact with said rollers and out of contact with the turning bottles, and means for heating the bottles as they are carried along and rotated to facilitate or assist the precipitation of silver from the solution.

12. In a bottle conveyor, a pair of spaced rollers having conical portions at the center for supporting a bottle in slightly inclined position thereon, cylindrical end portions provided on each roller, a shaft passing through each roller, bearings in said end portions for supporting the roller rotatably on its shaft, and means connected to said shafts for moving said rollers as a unit, and shoulders formed on said rollers at the smaller end of said central conical portions to engage the inclined bottle and hold the same in predetermined position.

13. In a bottle conveyor, an endless carrier having spaced rollers for supporting bottles in a substantially horizontal position, an electric motor for driving said carrier, and a switch operated by a horizontal bottle on said carrier to open the motor circuit when said bottle reaches a certain position, said switch including a movable arm mounted over the carrier and hanging in the path of a bottle on the carrier.

14. In a bottle conveyor, an endless carrier for supporting bottles, in substantially horizontal position, an electric motor for driving said carrier, rotary means operated independently of said carrier for rotating said bottles, and switch mechanism operated by a bottle on said carrier to automatically open the motor circuit and stop the carrier unless the bottle is removed when it reaches a predetermined position on the carrier, said rotary means being unaffected by the stopping of the carrier.

15. In bottle-silvering apparatus, a carrier for conveying a plurality of double-walled bottles containing a silver solution in the vacuum chamber, said bottles being supported in substantially horizontal position, means for rotating said bottles while on the carrier, so that the silver solution comes in contact with the entire surface to be silvered, said rotating means including a driving member engaging said carrier but out of contact with the supported bottles, which are thus free to be removed while rotating, an electric motor for operating said carrier, and switch mechanism operated by a bottle on said carrier to automatically open the motor circuit and stop the carrier unless a bottle is removed when it reaches a predetermined position in its path of travel, said rotating means being unaffected by the stopping of the carrier.

16. In a bottle conveyor, a series of rollers for supporting bottles, means for moving said rollers as a unit to carry the bottles from the loading end to the discharging end of the machine, means for rotating said rollers about their axes during their forward movement, so that the bottles are turned while being carried along, and means operated by a bottle on said rollers to automatically stop the forward movement of said rollers without interrupting their rotary movement.

17. In the manufacture of double-walled vacuum bottles, a machine having a carrier provided with rotary means for supporting bottles in substantially horizontal position, said bottles containing a silver solution in the vacuum chamber thereof, means for operating said carrier to convey the bottles forward, means for rotating said rotary supporting means independently of the bottles on the carriers, whereby the bottles are turned during their forward movement to allow the silver solution to come in contact with the entire surface to be silvered, said rotating means permitting removal of a bottle while turning, means for heating the bottles inside and outside to a substantially uniform temperature as they pass through a certain section of the machine, said heating of the bottles facilitating the precipitation of silver, and means for compelling the removal of the bottles from the carrier when each bottle reaches a predetermined position after passing through the heating zone, said compelling means stopping the forward movement of the bottles without interrupting their rotary movements.

18. In the manufacture of double-walled vacuum bottles, a machine having means for supporting and agitating a bottle containing a silver solution in its vacuum space to allow the solution to come in contact with the entire surface to be coated, means for subjecting the outer and inner walls of the bottle to predetermined heat while the bottle is being agitated so as to assist or facilitate the precipitation of silver, and means for compelling removal of the bottle from its supporting means after the silver has been precipitated to permit drawing off the remaining solution and filling the silvered chamber with water, whereupon the water-filled bottle is replaced on the supporting means and agitated to rinse the silvered chamber and make the coating smooth, said compelling means stopping the forward movement of the bottles without interrupting their agitating movements.

19. A machine of the class described comprising a main supporting frame, a pair of sprocket wheels mounted at each end of the frame, a pair of driving chains connecting the front and rear sprocket wheels, means for driving said sprocket wheels, a plurality of transverse shafts secured to said chains in properly spaced relation, rollers mounted on said shafts and adapted to support bottles between adjacent rollers, each roller having a cylindrical end portion, an endless belt held in frictional contact with the cylindrical end portions of said rollers, and means independent of said driving means for rotating said belt to turn the bottles while supported on the rollers.

20. A machine of the class described comprising a main supporting frame, a pair of sprocket wheels mounted at each end of the frame, a pair of driving chains connecting the front and rear sprocket wheels, means for driving said sprocket wheels, a plurality of transverse shafts secured to said chains in properly spaced relation, rollers mounted on said shafts and adapted to support bottles between adjacent rollers, guide rails mounted on said frame, wheels on the ends of said transverse shafts for engaging said rails to support said rollers, and a belt arranged to engage said rollers at the bottom to rotate the bottles supported thereon.

MINER P. WETMORE.